(12) United States Patent
Kleine et al.

(10) Patent No.: US 7,061,230 B2
(45) Date of Patent: Jun. 13, 2006

(54) CIRCUIT AND METHOD FOR MEASURING DISTANCES

(75) Inventors: Ulrich Kleine, Helmstedt (DE); Falk Roewer, Magdeburg (DE); Klaus Salzwedel, Magdeburg (DE); Felix Mednikov, Ortenburg (DE); Martin Sellen, Ortenburg (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 44 days.

(21) Appl. No.: 10/803,298

(22) Filed: Mar. 18, 2004

(65) Prior Publication Data

US 2004/0201376 A1 Oct. 14, 2004

Related U.S. Application Data

(63) Continuation of application No. PCT/DE02/03507, filed on Sep. 19, 2002.

(30) Foreign Application Priority Data

Sep. 19, 2001 (DE) ................................ 101 46 287

(51) Int. Cl.
   *G01B 7/14* (2006.01)
   *H03B 1/00* (2006.01)
(52) U.S. Cl. .................................. 324/207.16; 327/554
(58) Field of Classification Search .......... 324/207.16, 324/207.18, 207.15, 207.11; 327/554
   See application file for complete search history.

(56) References Cited

U.S. PATENT DOCUMENTS

| | | | | |
|---|---|---|---|---|
| 4,731,591 A | * | 3/1988 | Weigand | 331/65 |
| 5,148,166 A | * | 9/1992 | Ribner | 341/143 |
| 5,223,830 A | * | 6/1993 | Romes | 340/870.35 |
| 5,281,860 A | * | 1/1994 | Krenik et al. | 327/407 |
| 5,589,778 A | | 12/1996 | Ono et al. | 324/654 |
| 5,629,619 A | | 5/1997 | Mednikov | 324/207.16 |
| 5,712,563 A | * | 1/1998 | Kawagoe et al. | 324/207.19 |
| 5,729,163 A | * | 3/1998 | McCleary et al. | 327/104 |
| 6,073,043 A | * | 6/2000 | Schneider | 600/424 |
| 6,462,536 B1 | * | 10/2002 | Mednikov et al. | 324/207.16 |
| 6,639,414 B1 | * | 10/2003 | Lien | 324/658 |

FOREIGN PATENT DOCUMENTS

DE 42 25 968 2/1994

* cited by examiner

*Primary Examiner*—Anjan Deb
(74) *Attorney, Agent, or Firm*—Alston & Bird LLP

(57) ABSTRACT

A circuit for measuring distances and which has at least two inputs (1, 2), at least one measuring coil (3), and at least one signal source, wherein at least two input signals ($e_{pos}$, $e_{neg}$) are generated by means of the signal source, and the inputs (1, 2) are activatable by means of the input signals ($e_{pos}$, $e_{neg}$). The input signals ($e_{pos}$, $e_{neg}$) are applied, preferably preprocessed, to the inputs of the measuring coil (3). The circuit is designed for use where little space is available for the circuit, with the input signals ($e_{pos}$, $e_{neg}$) being applied to a preferably timed SC network, which generates a measuring output signal that is dependent on temperature. A corresponding method is also described.

26 Claims, 10 Drawing Sheets

CIRCUIT AND METHOD FOR MEASURING DISTANCES

CROSS REFERENCE TO RELATED APPLICATION

The present application is a continuation of international application PCT/DE02/03507, filed Sep. 19, 2002, and which designates the U.S. The disclosure of the referenced application is incorporated herein by reference.

BACKGROUND OF THE INVENTION

The invention relates to a circuit for measuring distances, of the general type disclosed in DE 42 25 968 A1 and corresponding U.S. Pat. No. 5,629,619. These prior patents disclose a circuit which is used to measure distances in a noncontacting manner by means of a measuring coil. The circuit is an inductive distance sensor, which is operated with relatively low frequencies in a range from 1 kHz to 10 kHz. To increase the accuracy of the measurement, it is necessary to determine the temperature influence on the measured value. In this known circuit, this occurs by means of a discrete circuit, which determines the dc voltage component with a circuit that is excited by ac voltages. The circuit has two inputs, which are activated in phase opposition by two input signals that are generated by a signal source. The operational amplifiers subsequent to the inputs operate with their resistors as voltage/current transformers, with the current being coupled into the measuring coil from both sides.

In the normal measuring operation, the circuit is activated with two ac voltages in phase opposition. To determine the temperature behavior, a dc offset voltage signal, i.e. dc component, is superposed upon the ac voltages. Since the circuit requires that the supplied current be equal at both ends of the measuring coil, different voltages adjust via the resistors, which are associated with the measuring coil, and additionally with respectively one operational amplifier circuit. These different voltages are caused by the offset of the ac voltages as well as the temperature-dependent components. The temperature-dependent output voltage, i.e. dc voltage, is determined with a further operational amplifier.

If one applies the superposition principle, one will see that the lower input of the circuit exhibits a low-pass behavior, and the upper input of the circuit a band-pass behavior. For ideal input signals in phase opposition, the total transfer function is thus a low-pass function, which is smoothed by a further capacitance. The low pass develops by the difference of a high-pass and an amplification path that is matched with it.

Since the offset in a first approximation is inversely proportionate to the temperature $$U = U_= \frac{K}{R_0(1 + \alpha T)}, \qquad (1)$$

it is thus possible to determine the temperature, and to correct the temperature-caused measuring errors. However, these measurements are only seldom inserted into the normal measurements with the mere ac voltage input signals. During the measurement with the mere ac voltage input signals, it is also possible to determine a dc voltage component, which is used to determine and correct the temperature drift of the measuring coil.

The known circuit is problematic in particular to the extent that the occurring time constants of the filtration are very great, and that because of its setup, the known circuit is made relatively large and, therefore, unsuitable for an application in which only a very small space is available for the circuit.

It is therefore an object of the present invention to describe both a circuit and a method for measuring distances of the initially described kind, which enable a use of the circuit also when the space available for the circuit is small.

SUMMARY OF THE INVENTION

In accordance with the invention, the foregoing object is accomplished by a circuit for measuring distances, which comprises at least two inputs, at least one measuring coil, and at least one signal source for generating at least two input signals. The input signals are applied to the inputs of the measuring coil. The input signals are also applied to at least one, preferably timed SC network, and used for generating a measuring signal and/or an output signal that is dependent on a temperature influence.

Furthermore, with respect to a method for measuring distances, the foregoing object is accomplished by a method which utilizes the circuit as described above and wherein the input signals are applied to at least one, preferably timed SC network, and used for generating a measuring signal and/or an output signal that is dependent on the temperature influence.

In accordance with the invention, it has been found that departing from the practice of the art, it is necessary to achieve a miniaturization of the circuits of the prior art for purposes of enabling a large number of possible uses of the circuit. This is accomplished in that the circuit is configured such that it can be set up as an integrated circuit, and that integration into an ASIC is made possible with a comparable transfer function of the known circuit. This is realized by the use of an SC network, i.e. a switched capacitor network, that exhibits an excellent matching behavior, and permits a particularly simple integration and with that a miniaturization of the circuit, thereby making the circuit applicable even in a very small space and thus universally applicable, while keeping the price of the circuit relatively low.

In this case, the high-pass circuit is replaced with an equivalent, passive double-resistive reference network, which comprises a voltage divider and an inductance that is parallel connected to one of the resistors of the voltage divider. The transfer function of this filter is that of a first-degree high-pass $$H(p) = \frac{pR_2 L}{R_1 R_2 + p(R_1 + R_2)L} \qquad (2)$$

The transfer function includes one zero point at p=0 and a pole at $p=-R_1R_2/(R_1+R_2)1/L$, with p being the general complex frequency variable.

By means of known methods, it is now possible to prepare a corresponding wave flow diagram. A three-gate parallel adapter is used to adapt to one another the different wave impedances of the three components of the reference network. The wave flow diagram of a resistive voltage source is on the left side of the three-gate parallel adapter, the wave flow diagram of the inductance is in the center above, and the wave flow diagram of the terminating resistance is on the right side. Since wave filters are time-discrete, one will define instead of the complex frequency variable p, a new frequency variable ψ with $$\psi = \frac{z-1}{z+1} = \tanh\left(\frac{pT}{2}\right), \text{ and } z = e^{pT} \quad (3)$$

where T=1/F is the sampling period, and F the sampling frequency. For purely imaginary frequencies p becomes jω and thus $$\psi = \tan\left(\frac{\omega T}{2}\right). \quad (4)$$

In this case, the adapter equations can be set up as follows:

$$b_3 = \sum_{v=1}^{2} \gamma_v a_v \quad (5)$$

$$b_2 = b_3 - a_2 \quad (6)$$

with incident voltages waves $a_i$ and emergent voltage waves $b_i$, where i=1, 2, 3. The output voltage results from $$U = \frac{a+b}{2} = \frac{b_3}{2}. \quad (7)$$

In addition, an inversion of the signal in the wave flow diagram of the inductance is to be realized $$b_2^* = -b_2 \quad (8)$$

If parasitic currents are not to be admitted, it will be possible to amplify positively delayed or negatively undelayed, or to integrate. With this technique, different ways of realizing switched-capacitor wave filters, i.e. SC filters, are known.

Within the scope of a very excellent determination of the temperature influence, it is possible that at least two input signals are essentially unipolar and/or opposite in phase. Preferably, the input signals are essentially square-wave voltages, since they permit generating input signals in phase opposition in a particularly simple manner.

To reduce low frequencies in the input signals, the input signals could be adapted for filtering by means of at least one filter in a proportionate way, and/or by means of a high-pass.

With respect to a particularly simple configuration, the SC network could comprise at least one SC amplifier. This would permit a particularly simple setup of the circuit.

In a further advantageous configuration, it would be possible to realize a first SC amplifier as a positive delayed SC amplifier, and/or to multiply the two inputs respectively with one factor. In a realization of the SC amplifier as a positive delayed SC amplifier, this would reduce parasitic currents.

To further avoid parasitic currents, a second SC amplifier could be realized as a positive delayed SC amplifier, and/or delay at least one of the input signals, preferably unamplified, by one half period of the clock frequency.

The SC network could comprise at least one SC integrator. With respect to avoiding parasitic currents, the SC integrator could be realized as a negative undelayed integrator, and/or have an amplification of 1, and/or be lossy.

In a particularly simple manner, the output of the SC integrator could be applied to a second input of the first SC amplifier.

With respect to a particularly simple determination of the temperature influence, an SC adder could be used to add the outputs of the first SC amplifier and the second SC amplifier. This would permit tapping at the output of the SC adder, a temperature-dependent output signal, which could be used for compensating the temperature influence.

The output of the first SC amplifier could be applied to the inputs of the SC integrator and/or the SC adder. In addition or as an alternative, the output of the second SC amplifier could be applied to a second input of the SC adder.

Furthermore, the SC network could also comprise at least one SC amplifier, and/or at least one SC integrator, and/or at least one SC adder.

To reduce parasitic currents, it would be possible to realize the first and/or the second SC amplifier and/or the SC adder negatively undelayed. In addition or as an alternative, the SC integrator could be realized positively delayed. This would permit inverting the output signal.

Within the scope of an advantageous configuration, the SC network could comprise at least one SC amplifier, and/or at least one SC integrator, and/or at least one SC difference amplifier.

In a further advantageous manner, it would be possible to store in the SC integrator at least one of the input signals preferably multiplied by a factor. A further factor could be again erasable by a capacitance of the SC integrator respectively from the result in each sampling period.

In an advantageous manner, an SC amplifier could be realized as a positive delayed SC amplifier, and/or delay at least one of the input signals unamplified and/or by one half period of the clock frequency.

To determine the temperature influence, the output of the SC amplifier and of the SC integrator could be adapted for subtraction by means of an SC difference amplifier, and/or for delay by one half period of the clock frequency.

In a particularly simple manner, the output of the SC amplifier could be applied to the second input of the SC integrator. With that, the output signal could have a delay of one clock period.

The method of the invention could be used in particular for operating a circuit as described above. The method is advantageous in that a circuit operated by this method is simple to integrate because of its excellent matching behavior.

There exist various possibilities of improving and further developing the teaching of the present invention in an advantageous manner. To this end, one may refer on the one hand to the claims of this application and on the other hand to the following description with reference to the drawing of preferred embodiments of the circuit according to the invention and the method of the invention for measuring distances. In conjunction with the detailed description of the circuit and the method of the invention with reference to the drawing, also generally preferred improvements and further developments of the teaching are described in greater detail.

BRIEF DSCRIPTION OF THE DRAWINGS

DETAILED DESCRIPTION OF THE PREFERRED EMBODIMENTS

The known circuit for measuring distances is provided as a discrete circuit and comprises two inputs 1, 2, as well as a measuring coil 3. A signal source (not shown) permits generating two input signals $e_{pos}$ and $e_{neg}$. The inputs 1, 2 are activated by means of the input signals $e_{pos}$ and $e_{neg}$. The input signals $e_{pos}$ and $e_{neg}$ are applied in a preprocessed form to the inputs 1, 2 of the measuring coil 3.

Figure 1:
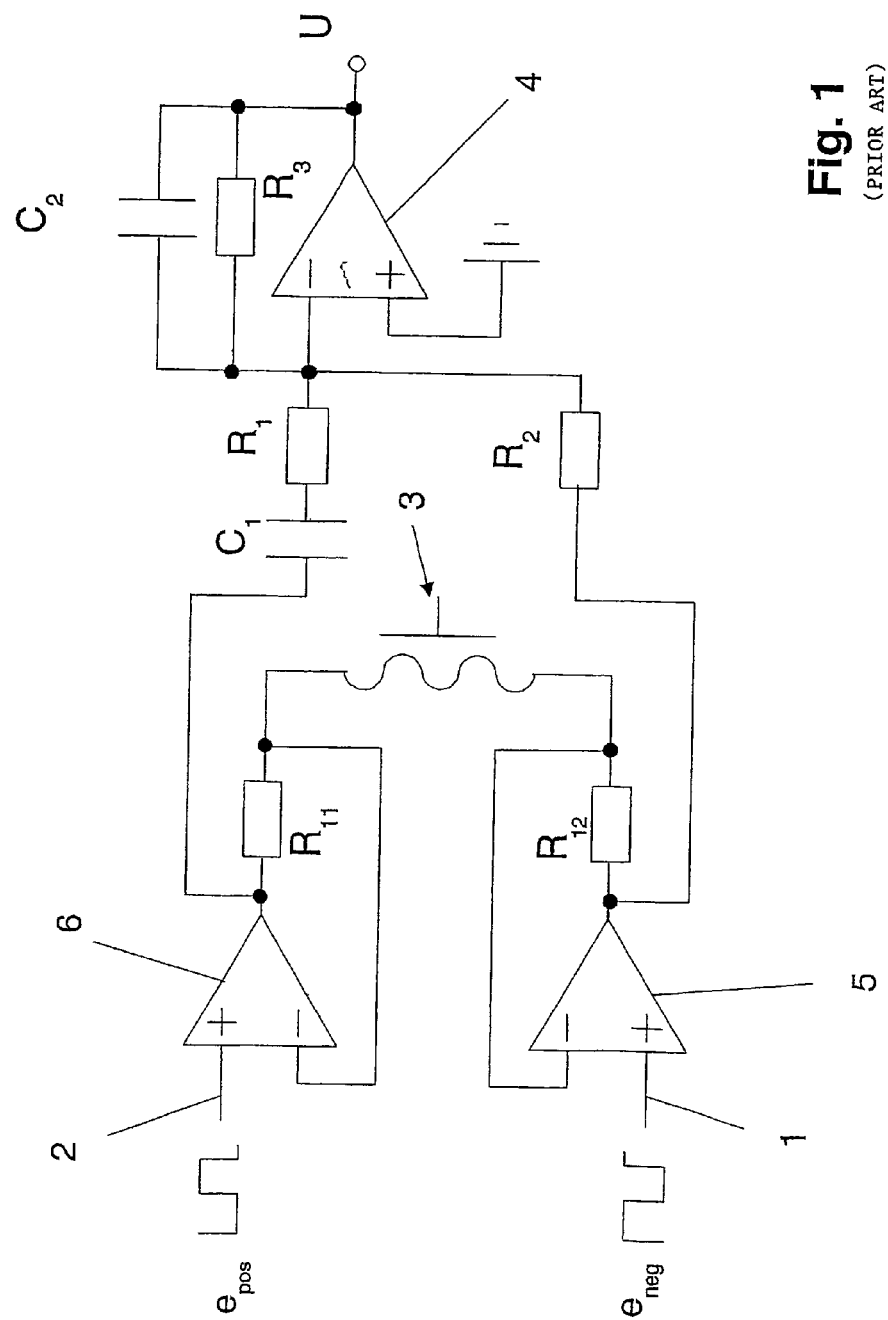
FIG. 1 is a schematic view of a known circuit for determining a temperature influence.
Figure 2:
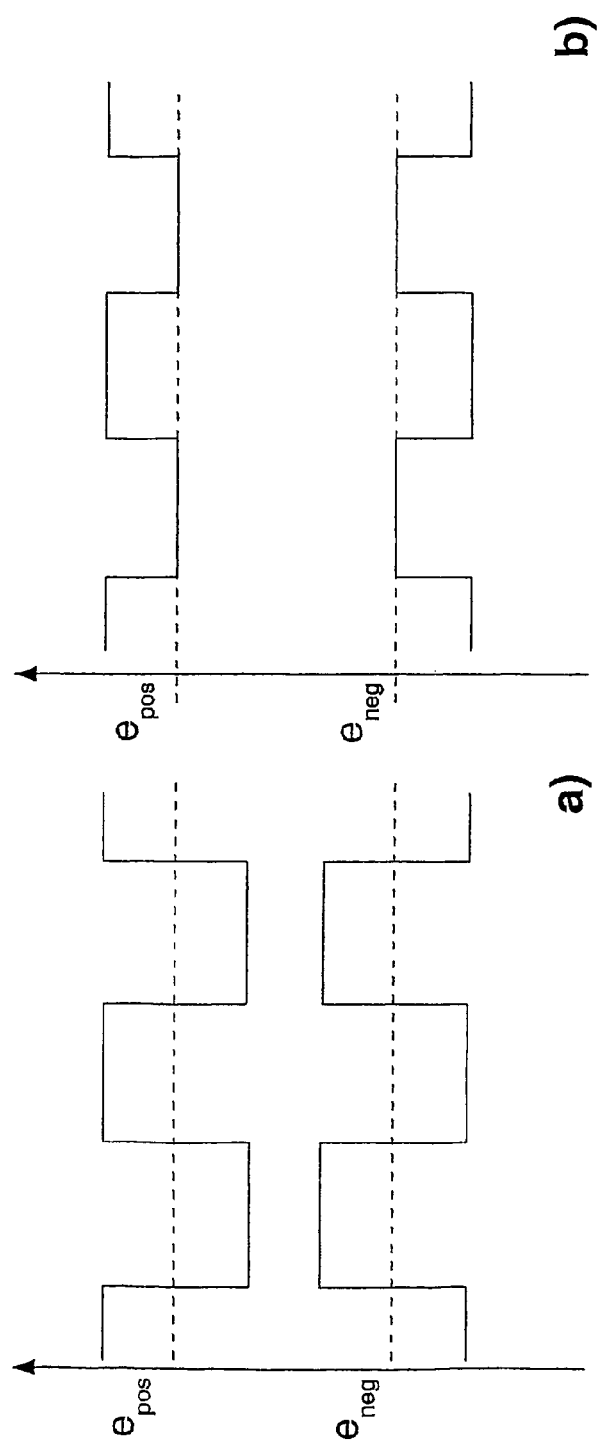
FIG. 2 is a graphic view of signals for operating the known circuit.

The known circuit that is excited by ac voltage makes it possible to determine by measuring a dc component, which is proportional to the temperature. Operational amplifiers that follow the inputs 1, 2 form with their resistors a voltage/current transformer. The current is coupled into the measuring coil 3 from both sides. In the normal operation, i.e., measuring operation, the ac signals $e_{pos}$ and $e_{neg}$ shown FIG. 2a are used for activating the inputs. However, to determine a linearly dependent temperature behavior of the circuit and the measuring coil 3, one uses the input signals $e_{pos}$ and $e_{neg}$ shown in FIG. 2b.

As is very clearly shown in FIG. 2b, these input signals $e_{pos}$ and $e_{neg}$ correspond to ac voltages that are superposed with a dc voltage. Since the circuit requires that the supplied current be the same at both ends of the measuring coil, a different voltage will adjust via resistors $R_{11}$ and $R_{12}$ because of the offset of the input signals $e_{pos}$ and $e_{neg}$ and measuring coil 3, as well as the temperature-necessitated components. From this voltage, an operational amplifier 4 determines a temperature dependent output voltage, the dc voltage U.

If one applies the superposition principle, one will find that an operational amplifier 5 associated with the input 1, exhibits a low-pass behavior in connection with resistors $R_2$ and $R_3$ and capacitance $C_2$, and that an operational amplifier 6 associated with the input 2 shows a band-pass behavior in connection with resistors $R_1$, $R_3$ and capacitances $C_1$ and $C_2$. For input signals in an ideal phase opposition, the total transfer function is a low-pass function, which is smoothed by capacitance $C_2$. The low-pass forms from the difference between a high-pass and an amplification path that is matched with it.

Since in a first approximation, the offset is dependent on the temperature in an inversely proportionate way $$U = U_= \frac{K}{R_0(1+\alpha T)}, \qquad (9)$$

it is thus possible to determine the temperature and to correct temperature-necessitated effects.

Figure 3:
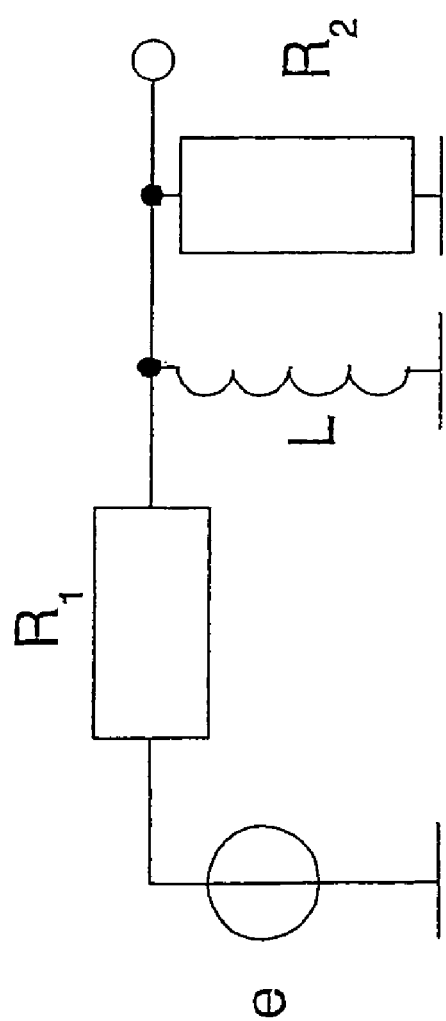
FIG. 3 is a schematic view of a passive, double-resistive reference network of a high-pass circuit.

FIG. 3 shows an equivalent, passive double-resistive reference network of a high-pass circuit. The network comprises a voltage source e, a voltage divider of resistors $R_1$ and $R_2$, and an inductance L switched parallel to the resistor $R_2$. The transfer function of this filter is that of a first-degree high-pass $$H(p) = \frac{pR_2L}{R_1R_2 + p(R_1+R_2)L} \qquad (10)$$

with a zero point at p=0 and a pole at p=−$R_1$ $R_2$/($R_1$+$R_2$) 1/L, with p again being the complex frequency variable.

Figure 4:
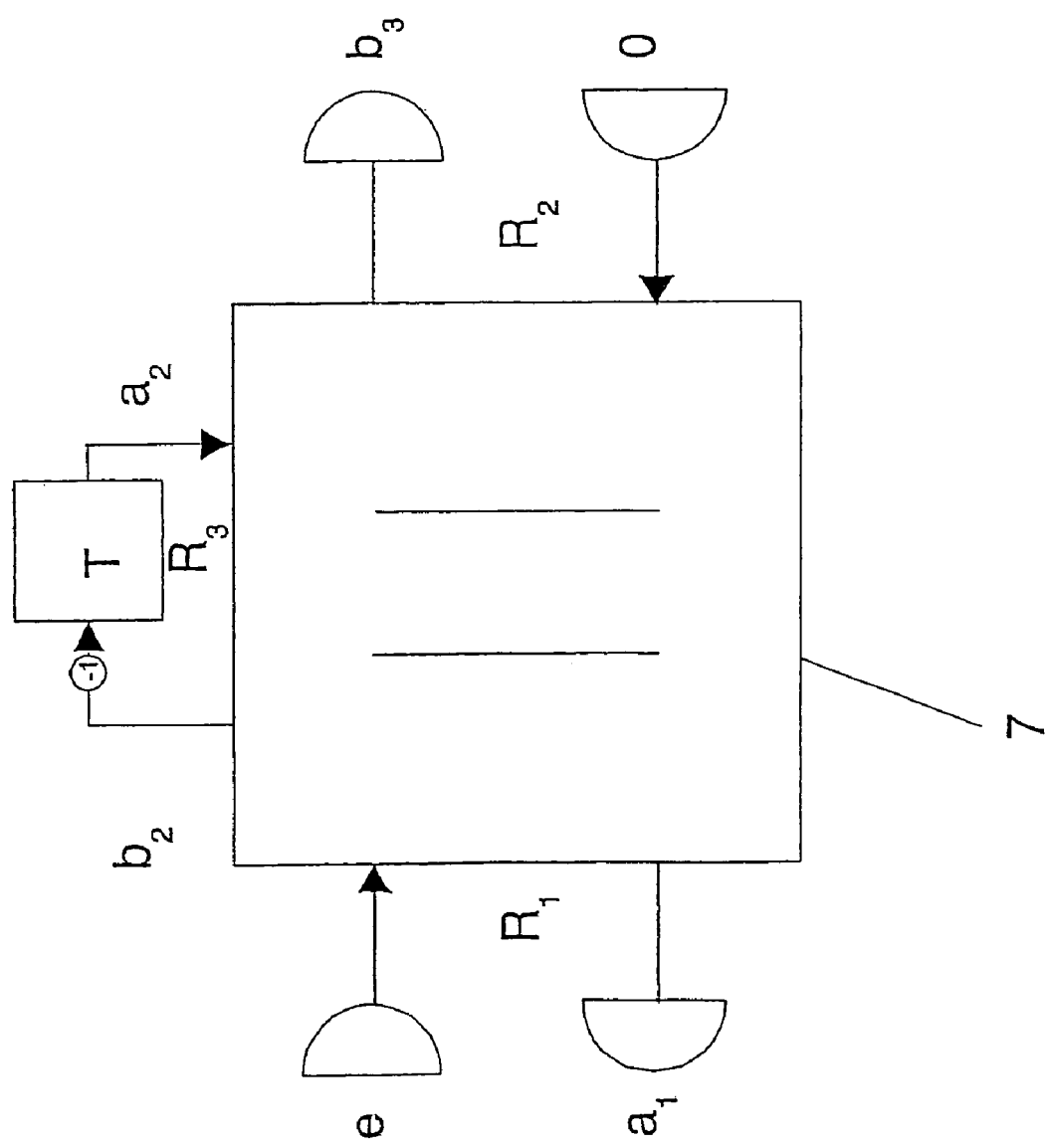
FIG. 4 is a schematic view of a wave flow diagram of the high-pass circuit of FIG. 3.

It is now possible to set up a corresponding wave flow diagram, as shown in FIG. 4. The wave flow diagram comprises a three-gate parallel adaptor 7, in which different wave impedances of the three components of FIG. 3 are adapted to one another. Located on the left side is the wave flow diagram of the resistive voltage source e, in the center above the wave flow diagram of the inductance L, and on the right side the terminating resistance $R_2$. Since wave filters are time-discrete, it is necessary to define in the place of the complex frequency variable p, a new frequency variable ψ with $$\psi = \frac{z-1}{z+1} = \tanh\left(\frac{PT}{2}\right), \text{ and } z = e^{pT} \qquad (11)$$

where T=1/F is the sampling period and F the sampling frequency. For purely imaginary frequencies, p becomes jω, and with that ψ becomes $$\psi = \tan\left(\frac{\omega T}{2}\right). \qquad (12)$$

In this case, the adapter equations that are to be computed, can be set up as follows:

$$b_3 = \sum_{v=1}^{2} \gamma_v a_v \qquad (13)$$

$$b_2 = b_3 - a_2 \qquad (14)$$

with the incident voltage waves $a_i$ and the emergent voltage waves $b_i$, where i=1, 2, 3. The output voltage results from $$U = \frac{a+b}{2} = \frac{b_3}{2}. \qquad (15)$$

In addition, the inversion of the signal is to be realized in the wave flow diagram of the inductance $$b_2^* = -b_2 \qquad (16)$$

With this technique, different kinds of realization of switched-capacitor wave filters, or SC filters, are described.

Figure 5:
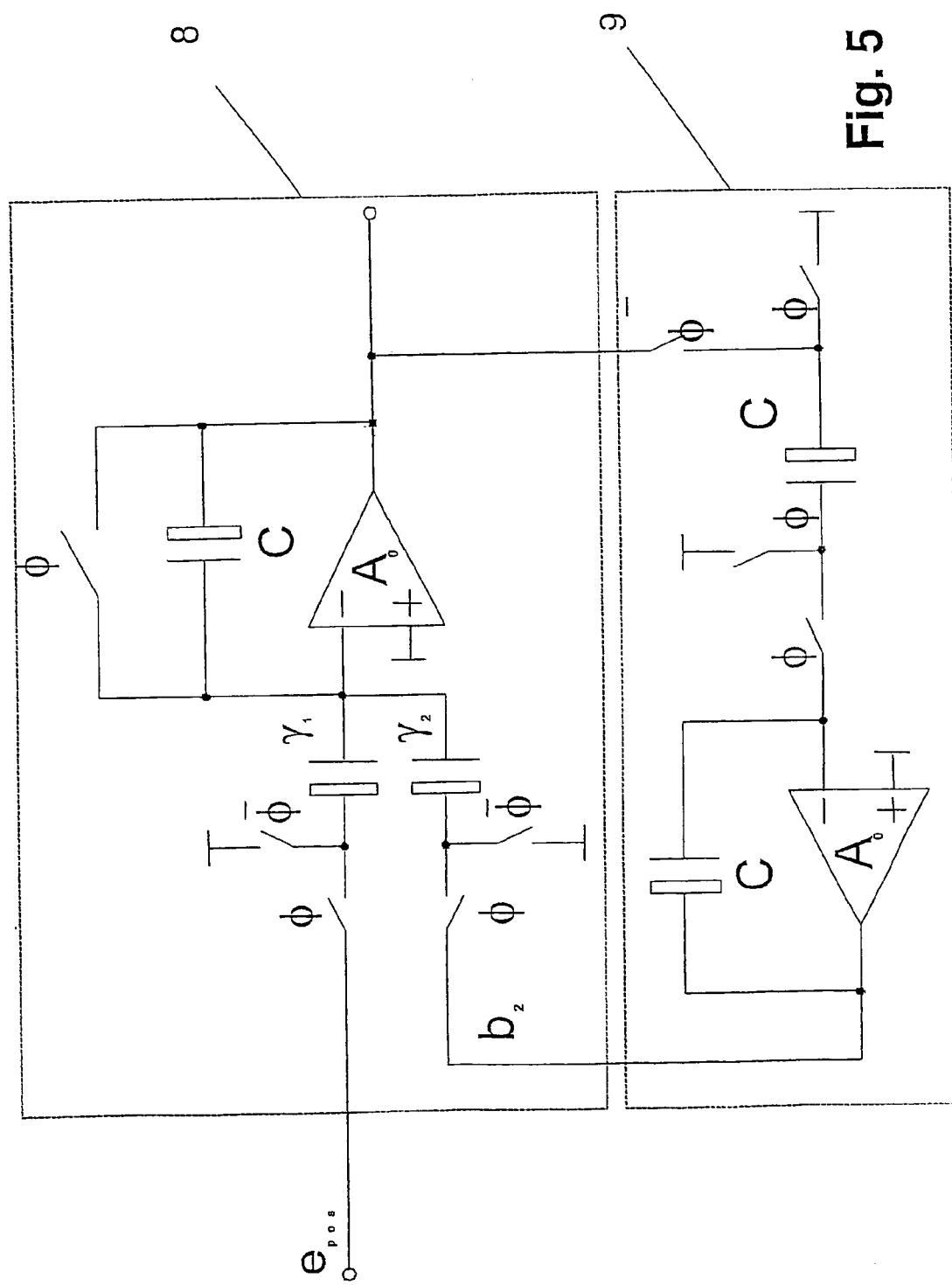
FIG. 5 is a schematic view of an SC realization of a high-pass circuit.

FIG. 5 shows an SC realization of the high-pass circuit in accordance with the invention. The circuit comprises in this case an SC network, wherein an SC amplifier 8 is used for reproducing the equation 13. The input signal $e_{pos}$ and the input signal $b_2^*$ of the SC amplifier 8 are positively delayed and multiplied according to equation 13 with the coefficients $\gamma_1$ and $\gamma_2$ respectively. The output of the SC amplifier 8 is simultaneously the output of the high-pass circuit.

Figure 6:
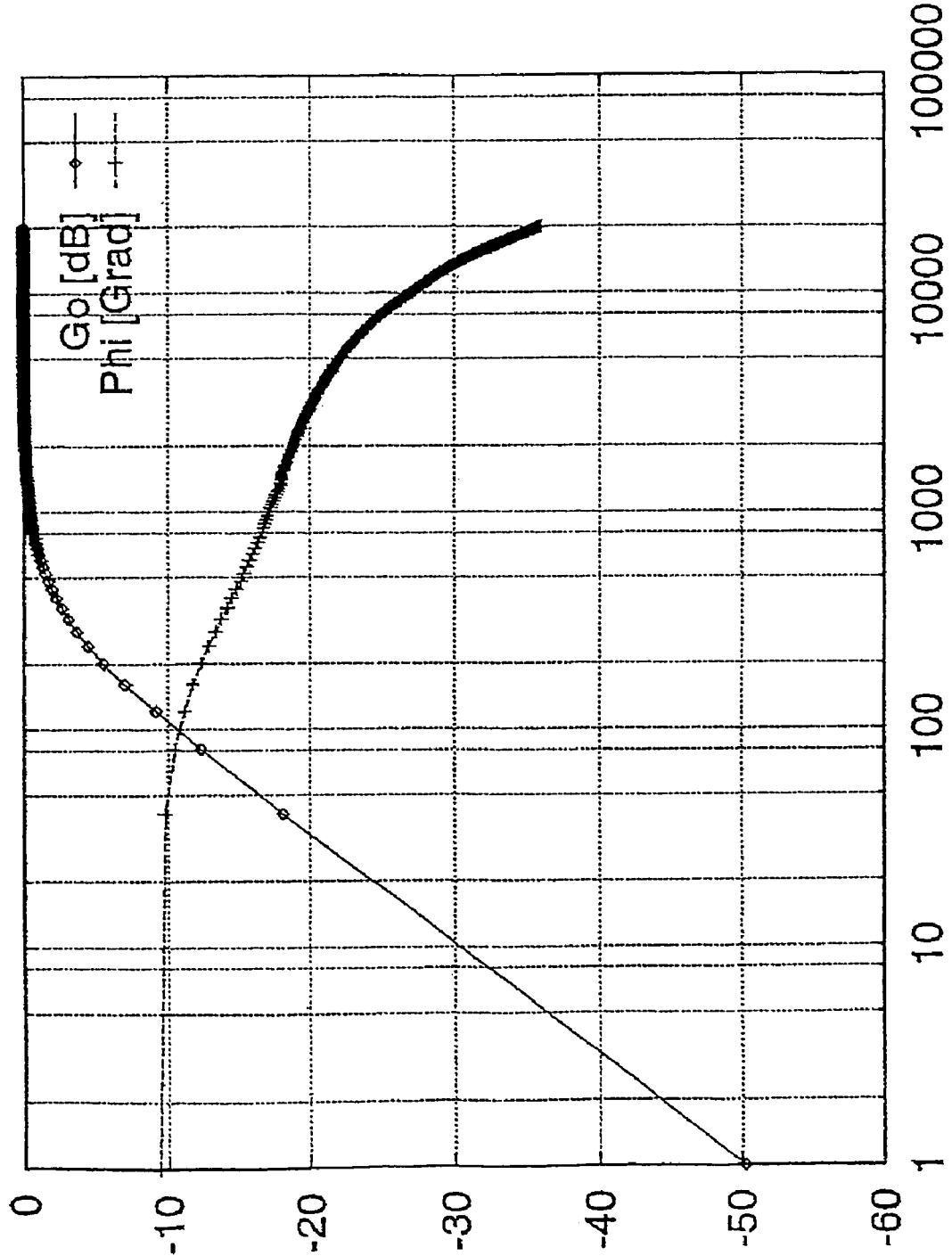
FIG. 6 shows a transfer function of the high-pass circuit of FIG. 5.

Since according to equation 15, the output voltage results as an arithmetic mean value from the incident and the reflected voltage wave, the 0 Db level is reached at the output, since the division with the factor Two is not performed. The two coefficients of equation 13 are reproduced as capacitance ratios in the signal paths. An undelayed negative SC integrator 9 forms the realization of both equation 13 and equation 15. By coupling the output signal of the SC integrator 9 into the SC amplifier 8 in phase Φ, the feedback loop is closed. The transfer function of this high-pass circuit is shown in FIG. 6, wherein the time-discrete high-pass function of the high-pass circuit is best seen.

Figure 7:
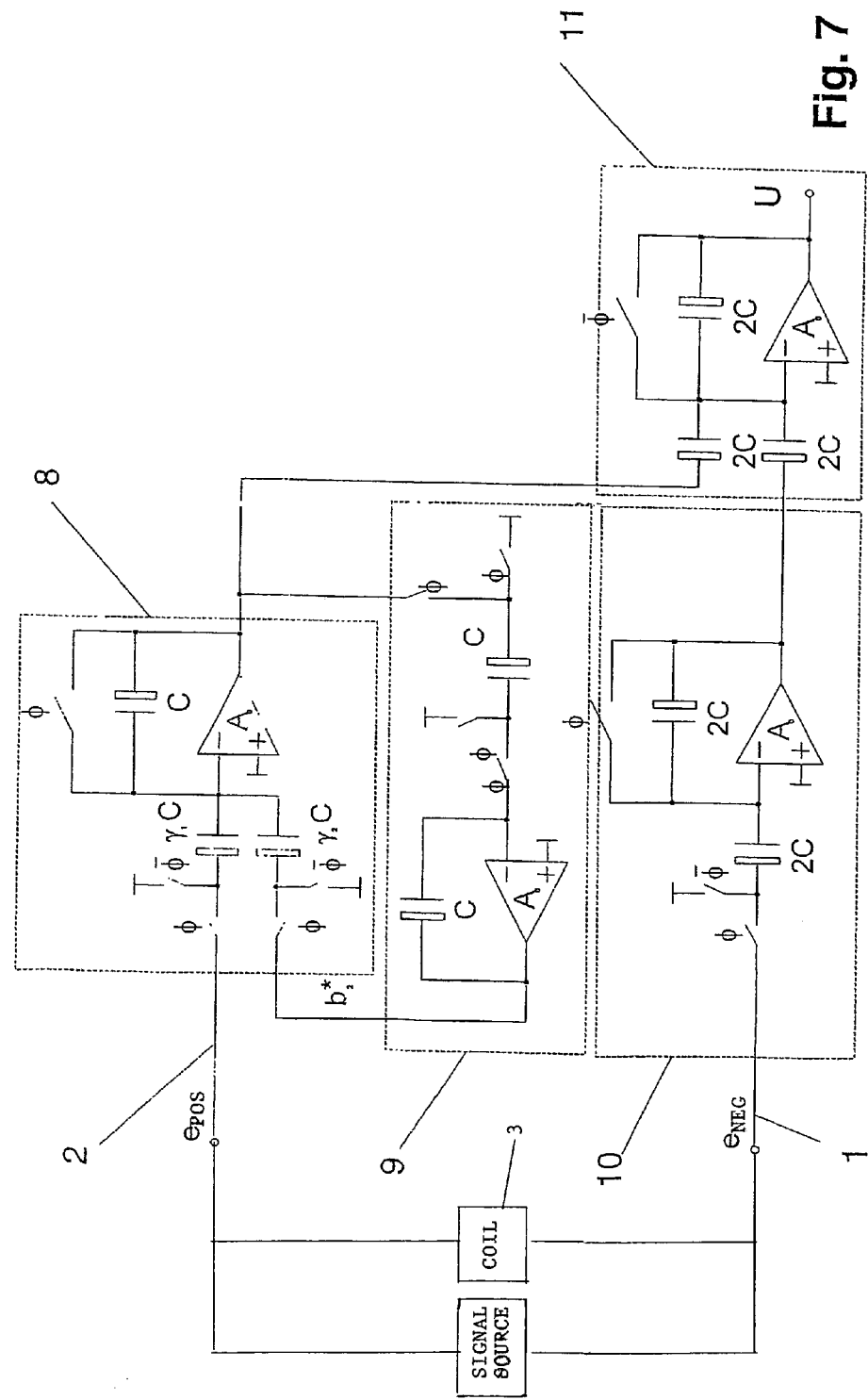
FIG. 7 is a schematic view of an embodiment of a circuit according to the invention.

A circuit of the present invention for measuring distances is shown in FIG. 7. The circuit comprises two inputs 1, 2, a signal source, as well as a measuring coil 3. The inputs 1, 2 are activated by means of two input signals $e_{pos}$ and $e_{neg}$ that are generated by the signal source. In accordance with the invention, the input signals $e_{pos}$ and $e_{neg}$ are applied to a timed SC network, and used for generating a measuring signal and/or an output signal U that is dependent on the temperature influence.

A part of the circuit corresponds to the high-pass circuit of FIG. 5. In addition, the circuit comprises an SC amplifier 10. The input signal $e_{neg}$ is applied to the output of the operational amplifier of the SC amplifier 10 at the same time as the SC amplifier 8 supplies the output signal to the operational amplifier. The timing of the SC amplifier 10 is furthermore identical with the timing of the upper SC amplifier 8.

The input signal $e_{neg}$ is shifted toward the output with a positive delay by half a clock period. Furthermore, the SC network comprises an SC adder 11, which is used to add the two input signals, i.e. the output signals of the SC amplifiers 8 and 10. The SC network is a positive, delaying SC circuit, which has a total delay of one clock period. Should this be too high, it would also be possible to realize the input amplifier and the output amplifier negatively undelayed. It will then be necessary to realize the SC integrator for a positive delay. In this instance the output signal is inverted.

Figure 8:
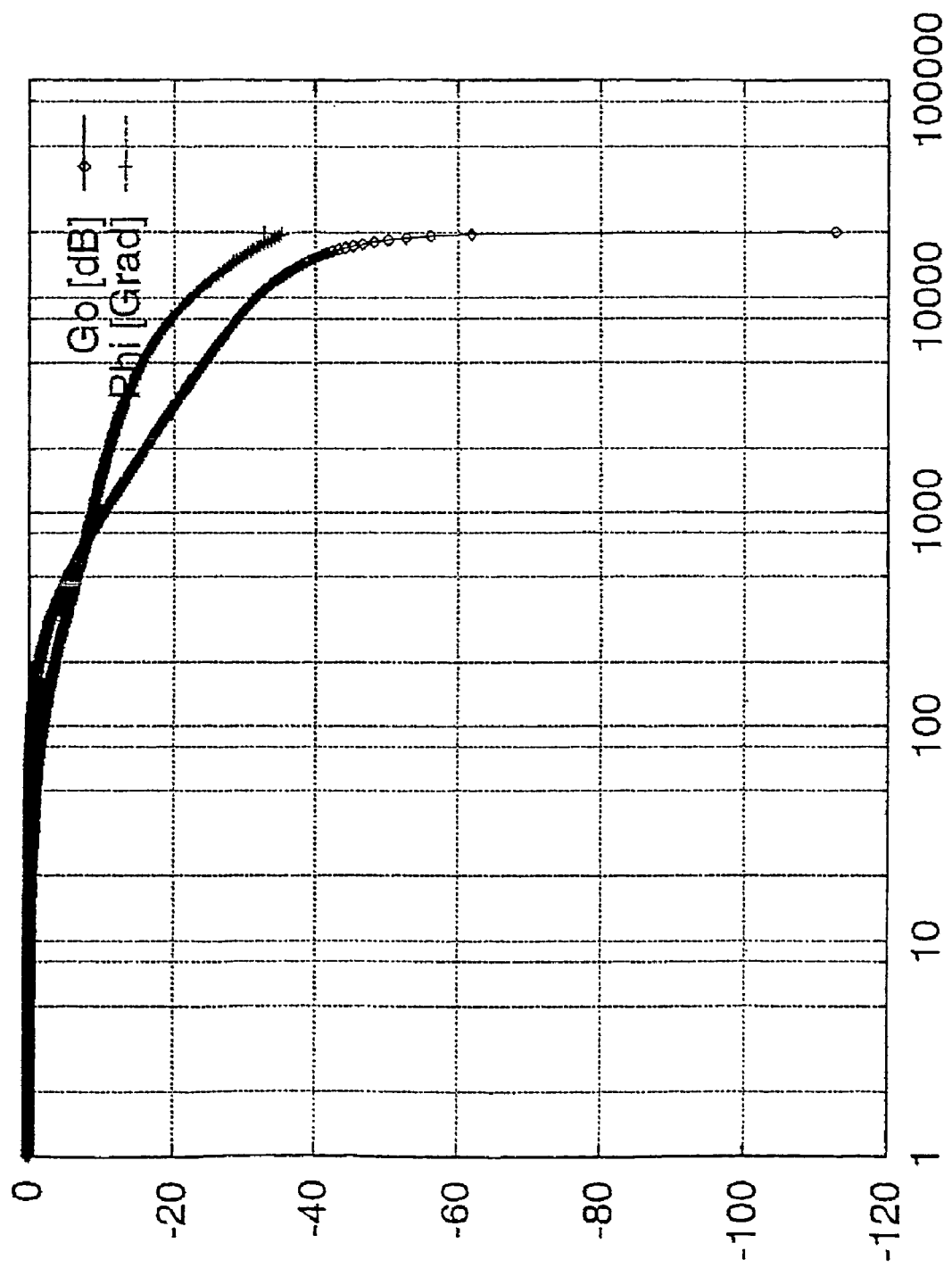
FIG. 8 shows a transfer function of the circuit shown in FIG. 7.

FIG. 8 illustrates the transfer function of the circuit of FIG. 7. As is clearly shown, the SC network shows a low-pass behavior and, with that, it is very well suited for dc measurements.

For inverting the signal, $b_2^*$ can be derived as follows:

$$b_2^* = a_2 - \gamma_2 a_2 - \gamma_1 a_1 = a_2(1-\gamma_2) - \gamma_1 a_1 \qquad (17)$$

The output voltage of the high-pass is the voltage via the resistor $R_2$, or the voltage via the inductance L, since both elements are parallel connected. Contrary to the resistor $R_2$, at which the incident wave always equals zero, the voltage of the inductance is defined by $$U = \frac{a_2 + b_2}{2} = \frac{a_2 - b_2}{2}. \qquad (18)$$

Accordingly, the output voltage results as difference of the incident wave $a_2$ and the negative reflected wave $b_2$ divided by 2. Without the division, one obtains again a maximum level of 0 dB. For this reason, the signal can again be added to the input signal $e_{neg}$.

Figure 9:
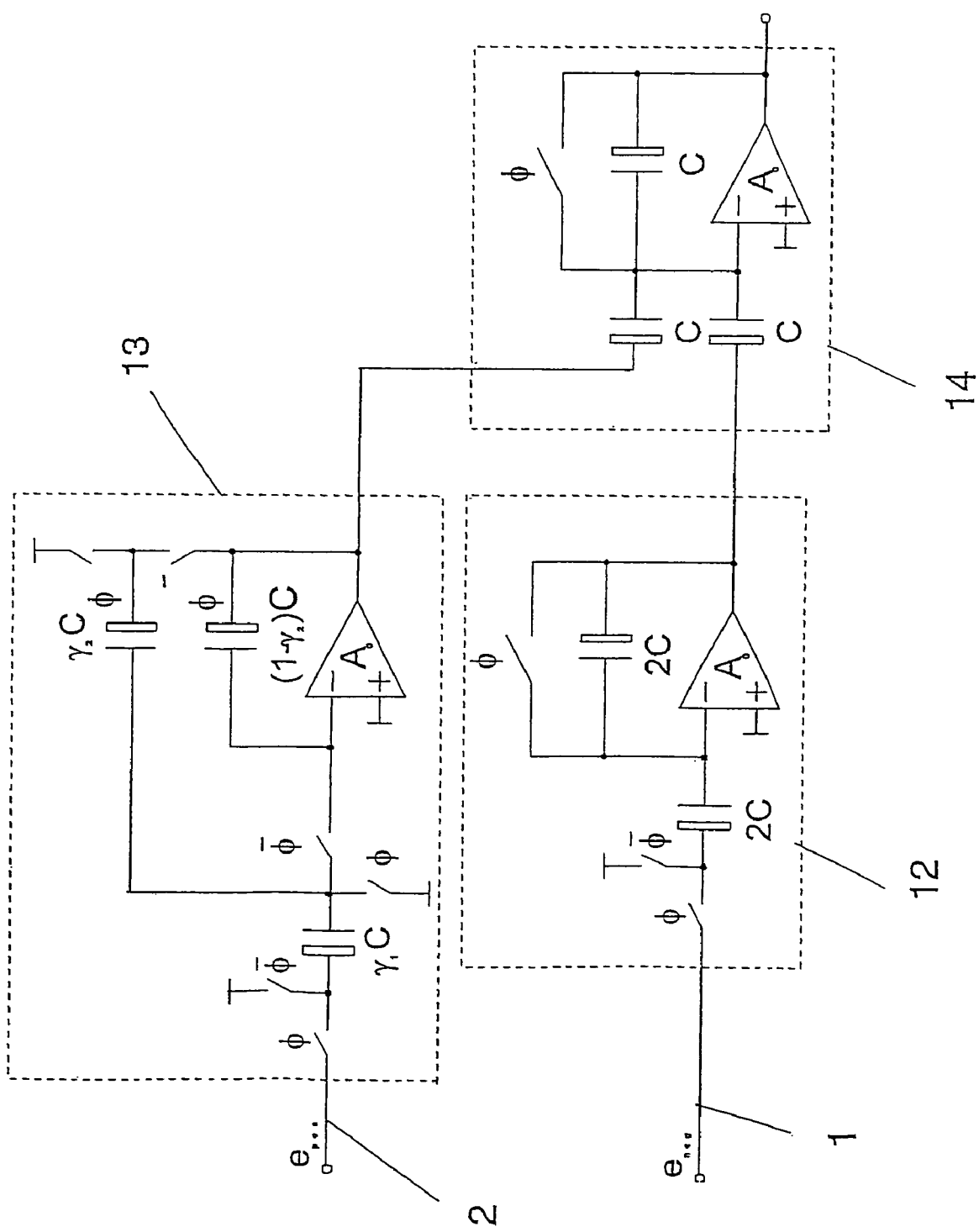
FIG. 9 is a schematic view of a further embodiment of the circuit according to the invention.

A circuit that realizes this, is shown in FIG. 9. The circuit comprises a signal source and a measuring coil as shown in FIG. 7, and a positive delayed SC amplifier 12, a lossy SC integrator 13, and an SC difference amplifier 14. As shown in FIG. 9, the factor $(1-\gamma_2)$ can be realized by the lossy SC integrator 13. In the case that $\gamma_2$ is smaller than 1, an integrator capacitance on the order of $(1-\gamma_2)C$ is used, and a capacitance on the order $\gamma_2$ is connected parallel thereto, which is periodically discharged.

Since for the described application, the limit frequency of the high-pass is always clearly in a frequency range from 0 to one fourth of the sampling frequency, $\gamma_2$ is always smaller than 1. Since the output value at the SC integrator 13 should always be positive, one multiplies in the circuit the input signal $e_{pos}$ positively delayed, with $\gamma_1$. The output voltage of the high-pass is generated by means of the SC difference amplifier 14. The input capacitance for the lossy integrator 13 is used to generate the difference $a_2 - b_2$. To this end, the difference amplifier 14 is initialized with Φ, and the output signal U is thus inverted. As previously described with reference to FIG. 7, the second input signal $e_{neg}$ is applied to the SC amplifier 12 and transferred to the SC difference amplifier 14.

Figure 10:
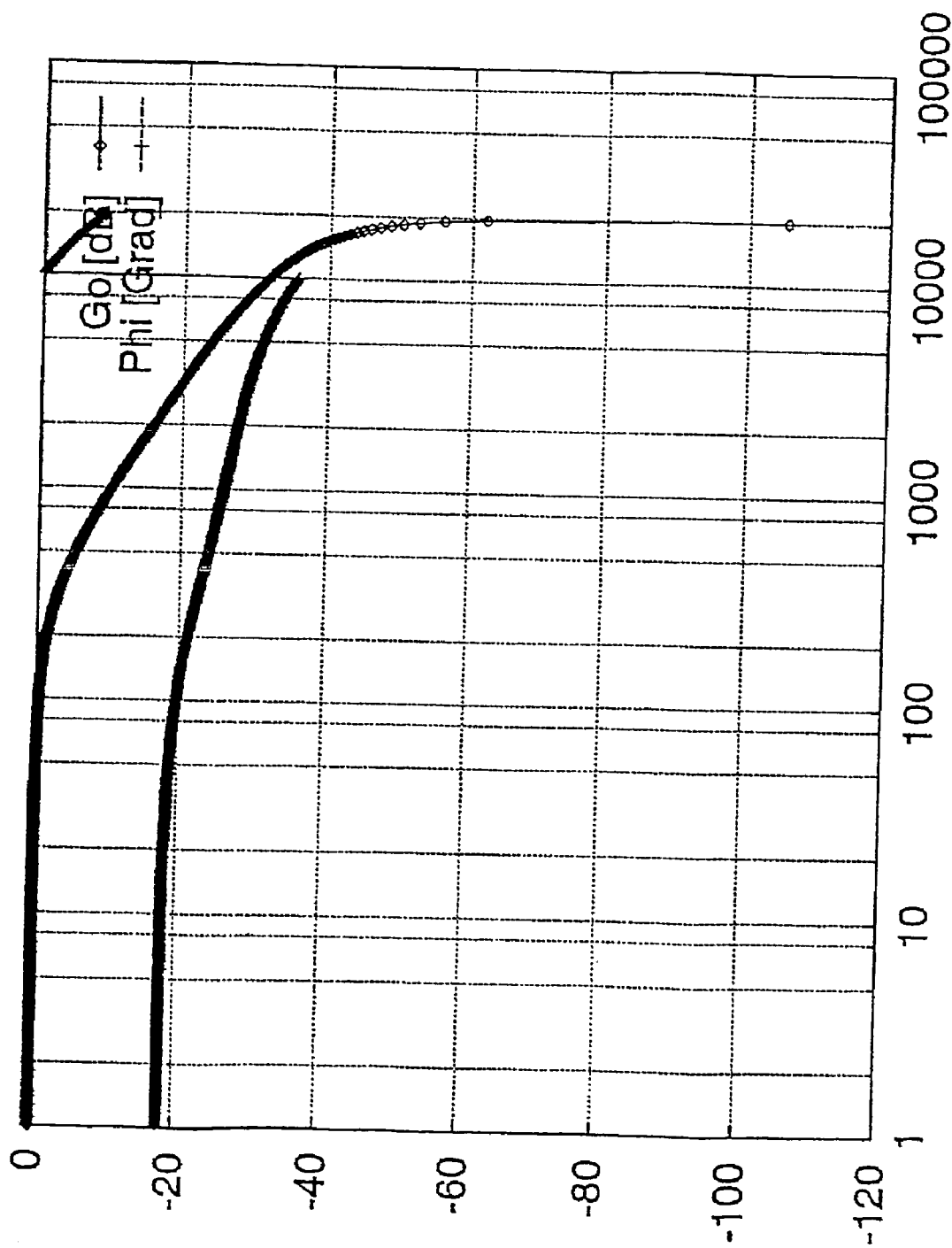
FIG. 10 shows a transfer function of the circuit shown in FIG. 9.

The transfer function of the circuit of FIG. 9 is shown in FIG. 10. As one notes, there is no change to be found from the transfer function of FIG. 8, except a phase rotation by 180°. Because of the excellent matching properties of the circuits, the measured dc output signal U is very well suited for a temperature correction.

As regards further details, the general description is herewith incorporated by reference for purposes of avoiding repetitions.

Finally, it should be expressly remarked that the above-described embodiments are used only to explain the claimed teaching, without however limiting it to these embodiments.

The invention claimed is:

1. A circuit for measuring distances, comprising at least two inputs, at least one measuring coil, and at least one signal source for generating at least two input signals, wherein the at least two inputs are activatable by means of the input signals, wherein the input signals are applied to the inputs of the measuring coil, and wherein the input signals are applied to at least one SC network and used for generating a measuring output signal that is dependent on a temperature influence, said at least one SC network comprising
a) a first SC unit connected to one of the input signals,
b) a second SC unit connected to the other of the input signals, and
c) a third SC unit connected to the outputs of the first and second SC units so as to combine the outputs of the first and second SC units.

2. The circuit of claim 1, wherein the at least two input signals are essentially unipolar or in phase opposition.

3. The circuit of claim 1, wherein the input signals are filtered proportionately by means of at least one filter or by means of a high-pass.

4. The circuit of claim 1, wherein the at least one SC network includes at least one SC amplifier.

5. The circuit of claim 4, wherein a first SC amplifier is configured as a positive delayed SC amplifier or multiplies the two inputs with respectively one factor.

6. The circuit of claim 4, wherein a second SC amplifier is configured as a positive delayed SC amplifier, or delays one of the input signals by one half period of a clock frequency.

7. The circuit of claim 1, wherein the SC network includes at least one SC integrator.

8. The circuit of claim 7, wherein the SC integrator is configured as a negative undelayed SC integrator, or includes an amplification of 1, or is a lossy SC integrator.

9. The circuit of claim 1, wherein the at least one SC network includes a first SC amplifier, a second SC amplifier, and an SC integrator having an output which is applied to a second input of the first SC amplifier.

10. The circuit of claim 9, wherein the outputs of the first SC amplifier and the second SC amplifier are added by means of an SC adder.

11. The circuit of claim 10, wherein the output of the first amplifier is applied to the inputs of the SC integrator or the SC adder.

12. The circuit of claim 11, wherein the output of the second SC amplifier is applied to a second input of the SC adder.

13. The circuit of claim 10, wherein the first and the second SC amplifier, and the SC adder are configured as negative undelayed circuits.

14. The circuit of claim 13, wherein the SC integrator is configured as a positive delay circuit.

15. The circuit of claim 10, wherein the SC adder produces an output signal which is inverted.

16. The circuit of claim 1, wherein the SC network includes at least one SC amplifier, and at least one SC integrator, and at least one SC difference amplifier.

17. The circuit of claim 16, wherein the circuit is configured such that at least one of the input signals is multiplied by a factor and stored in the SC integrator.

18. The circuit of claim 17, wherein the circuit is configured such that the factor is erased by a capacitance of the SC integrator during each clock period.

19. The circuit of claim 16, wherein the at least one SC amplifier is configured as a positive delayed SC amplifier which delays at least one of the input signals unamplified by a half period of a clock frequency.

20. The circuit of claim 16, wherein the outputs of the SC amplifier and the SC integrator are subtracted by means of the SC difference amplifier or be delayed by a half period of a clock frequency.

21. The circuit of claim 16, wherein the output of the SC amplifier is applied to a second input of the SC integrator.

22. The circuit of claim 1, wherein the at least one SC network generates an output signal which has a delay of one clock period.

23. The circuit of claim 1, wherein the first and second SC units process the respective input signals differently.

24. The circuit of claim 24, wherein the first and second SC units are configured for adding, or subtracting, or amplifying, or integrating the respective inputs signals.

25. The circuit of claim 24, wherein the third SC unit comprises a SC adder or a SC difference amplifier.

26. A method for measuring distances, utilizing a measuring circuit which comprises at least two inputs, at least one measuring coil, and at least one signal source, comprising the steps of generating at least two input signals by means of a signal source which are applied to the inputs and applied to inputs of the measuring coil, and including applying the input signals to at least one SC network which is configured for generating a measuring output signal that is dependent on temperature, said at least one SC network comprising a) a first SC unit connected to one of the input signals, b) a second SC unit connected to the other of the input signals, and c) a third SC unit connected to the outputs of the first and second SC units so as to combine the outputs of the first and second SC units.

* * * * *